United States Patent [19]

Meunier et al.

[11] Patent Number: 5,141,911
[45] Date of Patent: Aug. 25, 1992

[54] OXIDATION CATALYSTS BASED ON SUPPORTED METALLOPORPHYRIN

[75] Inventors: Bernard Meunier, Castanet; Gilles Labat, Toulouse; Jean-Louis Seris, Jurancon, all of France

[73] Assignees: Societe Nationale Elf Aquitaine, Courbevoie; Atochem, Puteaux, both of France

[21] Appl. No.: 671,715

[22] PCT Filed: Aug. 7, 1990

[86] PCT No.: PCT/FR90/00601
§ 371 Date: Apr. 3, 1991
§ 102(e) Date: Apr. 3, 1991

[87] PCT Pub. No.: WO91/01806
PCT Pub. Date: Feb. 21, 1991

[30] Foreign Application Priority Data

Aug. 10, 1989 [FR] France .................................. 89 10761

[51] Int. Cl.$^5$ .............................................. B01J 31/06
[52] U.S. Cl. .................................. 502/159; 502/163; 502/167
[58] Field of Search ........................ 502/159, 163, 167

[56] References Cited

U.S. PATENT DOCUMENTS 4,800,188  1/1989  Shepherd ............................. 502/159

Primary Examiner—Patrick P. Garvin
Assistant Examiner—Brent M. Peebles
Attorney, Agent, or Firm—Burgess, Ryan & Wayne

[57] ABSTRACT

There is disclosed a catalyst for the liquid phase oxidation of functional groups comprising metalloporphyrins carrying anionic groups as substituents in which the metalloporphyrins are immobilized on a support which is made of a polymer containing nitrogenous groups used as a Lewis base and to a process of making the same.

8 Claims, No Drawings

OXIDATION CATALYSTS BASED ON SUPPORTED METALLOPORPHYRIN

FIELD OF THE INVENTION

The present invention relates to new oxidation catalysts comprising of synthetic metalloporphyrins immobolized on insoluble supports.

BACKGROUND OF THE INVENTION

The use of synthetic metalloporphyrins as catalysts for liquid-phase oxidation reactions has for a number of years been the subject of numerous publications, for example those illustrated by Mc. Murry, J. T. Groves in "Cytochrome P. 450; Structure, Mechanism and Biochemistry" Plenum, New York, 1986, pp 1–28.

These publications have revealed the important part played by the proximal ligand in the control of the rate, of the chemical selectivity and of the stereochemistry of the oxidation reaction (cf. B. Meunier et al., J. Am. Chem. Soc. 106, 6668-6676; 1984). To modify the reactivity of the catalyst systems which are employed, comprising of metalloporphyrins and an oxidizing agent such as $H_2O_2$ or peroxides, this has led the investigators to add to the reaction mixture a nitrogenous base such as pyridine or imidazole (French patent 81/23,665 of 18.12.1981), which acts as an axial ligand. However, the limitation of this method is linked with the fact that the nitrogenous base is present in excess in a highly oxidizing reaction medium, which results in an oxidation of the cocatalyst and hence in a high consumption of the nitrogenous base.

Furthermore, these oxidative processes are conducted using homogeneous catalysis, and this involves difficulties in subsequently isolating the reaction product from the reaction mixture, and also problems in recovering the catalyst and its cocatalyst with a view to reutilization.

To overcome this disadvantage it has been proposed by the Assignee herein in a pending French application No. 88/09,169 of July 1988, to work using heterogeneous catalysis with a sulfonated metalloporphyrin catalyst fixed on a support of the ion exchange resin type (Amberlite R). This solution, which is advantageous on an industrial scale, does not, however, avoid the need to add the nitrogenous base to the reaction mixture.

The objective of the present invention is oxidation catalysts which make it possible to work using heterogeneous catalysis and which, comprising the axial ligand needed for the reaction, avoid the addition of the nitrogenous base and hence its consumption during the reaction process.

The subject of the present invention is new catalysts for liquid-phase oxidation of functional organic compounds, comprising of metalloporphyrins carrying anionic groups as substituents, active in the presence of an oxidizing agent, in which the metalloporphyrin is immobolized on a support, insoluble in the liquid phase, of polymeric type comprising nitrogenous groups acting as a Lewis base. The attachment of the metalloporphyrin takes place via a covalent bond between the metal of the porphyrin and the nitrogen of the supporting polymer.

The metalloporphyrins forming part of the composition of the catalysts of the invention are all porphyrins which have an axial site which is free or which is occupied by an axial ligand which can be easily displaced by the potential coordinate. Specifically, the nitrogen of the nitrogenous group originating from the support employed and negatively charged groups (or producing such groups after ionization), which are referred to in this text by the expression anionic groups, at the periphery of the porphyrinic ligand.

The most usual anion groups in the case of the porphyrinic compounds are carboxylic acid or sulfonate functional groups.

The metalloporphyrins employed for the catalysts of the invention can be the metal complexes of porphyrins of the class of natural porphyrins containing no substituents in a meso position but at least one anionic group in the pyrrolic positions. By way of examples there may be mentioned deuteroporphyrin IX, mesoporphyrin-IX, protoporphyrin-IX, and uroporphyrins I and III.

The preferred metalloporphyrins are porphyrins which are meso-substituted by aromatic radicals. The aryl radicals themselves will carry substituents such as alkyl or aryl groups or halogens, for example chlorine, in the ortho,ortho' (2,6) positions and at least one sulfonate functional group or a carboxylic acid functional group.

The porphyrins are metallized as a function of the type of reaction used. The metal will be chosen from, for example, chromium, manganese, iron, cobalt, nickel, platinum or iridium. Iron and manganese are particularly well suited for many oxidation reactions.

By way of example of metalloporphyrins which are well suited to the catalysts of the invention there may be mentioned: Mn-TMPS and FE-TMPS; TMPS denoting 5,10,15,20-tetrakis (3,5-disulphonatomesityl)porphyrin. These porphyrins are described in a pending French patent application by the Assignee herein. There may also be mentioned: Mn-TDCPS and Fe-TDCPS, that is to say the manganese and iron derivatives of 5,10,15,20-tetrakis (3-sulphonato2,6-dichlorophenyl)porphyrin and the metal derivatives of meso-tetra(para-carboxyphenyl)porphyrin.

The support on which the metalloporphyrin will be immobolized will be a polymer or a copolymer carrying nitrogenous groups used as a Lewis base. These nitrogenous groups will result either from the copolymerization of a monomer carrying these groups or from the grafting of these groups onto a polymer. These nitrogenous groups will be preferably of the pyridine, histidine or imidazole type.

By way of examples of such polymers there may be mentioned polyvinylpyridine/divinylbenzene (2, 3, or 4-vinylpyridine/divinylbenzene) copolymers, polyvinylimidazole/divinylbenzene copolymers, polyphenylquinoxaline/divinylbenzene copolymers, poly(N-vinylcarbazole)/divinylbenzene copolymers, polyvinylpyridine/ styrene copolymers, crosslinked polyhistidines or copolymers of histidine-rich amino acids.

The immobilization of the metalloporphyrin on the support will be produced by attaching the nitrogenous groups to the metal of the metalloporphyrin by covalent bonds according to a known process.

The process of attaching by a covalent bond will comprised treating the polymers containing the nitrogenous groups used as a Lewis base with an acid leading to a cationic resin by protonation of the nitrogenous sites, in treating the said resin with a base permitting the deprotonation of these nitrogenous sites, in bringing the resin into contact with the anionic metalloporphyrin for a time which is sufficient for an attachment of covalent type and then, finally, in reprotonating with an acid the nitrogenous groups which are not involved in the covalent attachment.

The reprotonation allows the creation of bonds between the anionic groups of the porphyrin and the ammonium-type nitrogenous cations of the polymer. This makes it possible to produce a double attachment—one of covalent-bond type and the other by electrostatic interaction —of the porphyrin to the sites of the polymer, endowing the final catalyst with great stability.

These catalysts can be employed:

in oxidative processes: oxidation of alcohols, aldehydes, decarboxylation (decarboxylation of phenylacetic acid to benzoic acid), oxidation of aliphatic and aromatic amines, oxidation of sulphides and of thiols and oxidative breaking of C—C, C—N and C—O bonds, in halogenation processes: chlorination and bromination of aliphatic and aromatic compounds (chlorination of βdiketones: chlorination of dimedone to chlorodimedone).

These reactions are carried out in an organic medium (dichloromethane, acetonitrile, etc.) or in an essentially aqueous medium (acetonitrile/buffered water mixture), in the presence of any suitable oxidizing agent: water-soluble organic and inorganic peracids and peroxides: $H_2O_2$, sodium hypochlorite, $KHSO_5$, magnesium salt of peroxyphthalic acid, or those which are soluble in an organic medium: e.g. tert-butyl hydroperoxide and cumene hydroperoxide.

The catalysts of the invention are illustrated by the examples below which relate to the preparation of the said catalysts and their use for the oxidation of benzyl alcohols: veratryl alcohol (I) and a dimer, 1-(3,4-dimethoxyphenyl)-2-(2-methoxyphenoxy)-1,3-propanediol (II).

EXAMPLE 1

The metalloporphyrins Mn-TMPS, Fe-TMPS, Mn-TDCPPS and Fe-TDCPPS are prepared first by processes which have already been described.

In the case of Mn-TMPS and Fe-TMPS the process comprises preparing TMP according to the method described by M. Kihn-Botulinski and B. Meunier (Inorg. Chem. 27, 209–210; 1988), in carrying out a sulfonation with hot oleum and then finally metallizing the TMPS originating from the preceding stage with manganese or iron salts.

In the case of Mn-TDCPPS and Fe-TDCPPS, TDCPP is prepared first according to the method described by J. S. Lindsey et al. J. org. Chem. 1989, 54, 828, TDCPP is sulfonated by the same method as above to obtain TDCPPS, which is finally metallized in a way which is similar to that of TMPS.

Attachment of Mn-TMPS and Fe-TMPS onto the poly(4-vinylpyridinium 4-toluenesulfonate) support crosslinked with the aid of 2% of divinylbenzene: Fluka product, 3.5 mmol of 4-toluenesulfonate per gram of resin, 100–200 mesh.

In a first stage the polymer is activated by liberating the basic form of the pyridines by washing 2 to 3 times with a solution of NaOH (2 M). The polymer is then washed successively with methanol, acetone and ethyl ether. The polymer is then dried under vacuum.

In a second stage the Mn-TMPS and Fe-TMPS complexes are attached to the activated polymer by adding 1 g of polymer to a 0.2 M solution of metallized porphyrins (32 mg of complex in 100 ml of MeOH). The attachment takes place in 30 min-60 min, with slow stirring until the solution is as clear as possible. The polymer is then washed with an MeOH/$H_2O$ mixture (50/50, v/v) and then 2 to 3 times with a 2% solution of acetic acid (pH 4.0) (in order to reprotonate the pyridines which have not been involved in the covalent attachment to the metal). The polymer is then washed with methanol, acetone and ethyl ether and is then dried under vacuum (2 μmol of Mn-TMPS or Fe-TMPS complexes are attached to 100 mg of support).

The Mn-TDCPPS and Fe-TDCPS catalysts, that is to say the manganese and iron derivatives of tetrasodium 5,10,15,20-tetrakis(3-sulphonato-2,6-dichlorophenyl)porphyrin (TDCPPS) are attached in the same way.

The quantity of complexes to be attached can be doubled, 3.2 mg of complexes on 50 mg of polymer. (2 μmol of complexes correspond to 50 mg of polymer).

EXAMPLES 2 to 12

General conditions

The various Mn-TMPS, Fe-TMPS, Mn-TDCPPS and Fe-TDCPPS catalysts immobilized on the exchange resin were employed for oxidizing the substrates I and II, using $KHSO_5$ as oxidizing agent. The catalyst immobolized on resin is added to the solution of substrate acetonitrile solution-pH buffer: 3 in the case of iron and pH 6 buffer in the case of the manganese. The reaction is begun by the addition of the oxidizing solution (Oxone R:2$KHSO_5$, $KHSO_4$, $K_2SO_4$).

Individual conditions

EXAMPLE 2

Substrate I (20 μmol, 3.36 mg) 500 μl of a 40 mM solution of veratryl alcohol in acetonitrile supported Fe-TMPS (2 μmol on 100 mg of support) 0.1 M citrate-phosphate buffer (1 ml):pH:3.0 $KHSO_5$ (100 μmol:30.7 mg dissolved in 500 μl of pH 3.0 buffer.

EXAMPLE 3

Same operating conditions as for Example 2, supported Fe-TMPS being replaced by supported Mn-TMPS and using a pH 6.0 phosphate buffer.

EXAMPLE 4

Same operating conditions as for Example 3, supported Mn-TMPS being replaced with supported Mn-TDCPPS.

EXAMPLE 5

Same operating conditions as for Example 2: replacement of the substrate I with the substrate II.

EXAMPLE 6

Same operating conditions as for Example 3: replacement of the substrate I with the substrate II and replacement of supported Mn-TMPS with supported Mn-TPPS (meso-tetra(4-sulphonatophenyl)porphyrin).

EXAMPLE 7

Same operating conditions as for Example 3: replacement of the substrate I with the substrate II.

EXAMPLE 8

Same operating conditions as for Example 3: replacement of the substrate I with the substrate II and modification of the pH:3.0.

EXAMPLE 9

Same operating conditions as for Example 4: replacement of the substrate I with the substrate II.

EXAMPLE 10

Same operating conditions as for Example 3: KHSO$_5$ being replaced with MMPP (magnesium salt of monoperoxyphthalic acid).

EXAMPLE 11

Same operating conditions as for Example 3, the catalyst of this Example 3 being reemployed after washing and drying.

EXAMPLE 12

Same operating conditions as for Example 7, the same catalyst being reemployed after washing and drying. The results obtained are summarised in Table I.

TABLE I

| Ex | Catalyst | pH | % conversion after 1 min | 15 min |
|---|---|---|---|---|
| 2 | Fe-TMPS | 3 | 7 | 15 |
| 3 | Mn-TMPS | 6 | 74 | 93 |
| 4 | Mn-TDCPPS | 6 | 90 | 91 |
| 5 | Fe-TMPS | 3 | 8 | 15 |
| 6 | Mn-TPPS | 6 | 60 | 69 |
| 7 | Mn-TMPS | 6 | 61 | 74 |
| 8 | Mn-TMPS | 3 | 63 | 74 |
| 9 | Mn-TDCPPS | 6 | 68 | 76 |
| 10 | Mn-TMPS | 6 | 57 | 82 |
| 11 | Mn-TMPS | 6 | 59 | 84 |
| 12 | Mn-TMPS | 6 | 67 | 67 |

EXAMPLES 13 to 15

These examples illustrate the use of the catalysts of the invention in a process of halogenation of functional organic compounds.

The reaction carried out is the chlorination of dimedone (1,1-dimethyl-3,5-cyclohexanedione) in position 4.

The reactants employed are the following: dimedone (20 μmol):500 μl of a 40 mM solution of dimedone in acetonitrile; supported Mn-TMPS (2 μmol on 100 mg of support); 0.1 M citrate-phosphate buffer (1 ml) pH:3.0; 125 mg of NaCl (200 μmol) chlorinating agent; H$_2$O$_2$ (100 μmol):12 μl of an 8.6 M H$_2$O$_2$ solution (Ex. 13).

In Example 14 Mn-TMPS is replaced with supported Fe-TMPS.

In Example 15 the reactants of Example 13 are used, the catalyst being reemployed for the 3rd time after washing and drying.

The operating conditions are the same as those of Example 2.

The results obtained are summarised in Table 2 below.

TABLE 2

| Examples | Catalyst | % formation of chlorodimedone after 30 min | 45 min | 60 min |
|---|---|---|---|---|
| 13 | Mn-TMPS | 8 | 12 | 13 |
| 14 | Fe-TMPS | 2 | — | 5 |
| 15 | Mn-TMPS | 6 | 11 | 12 |

It should be noted that at the end of one hour's reaction, a dimedone conversion yield of 80% is observed and that a hydroxydimedone is formed besides the chlorodimedone. However, the chlorinated product is of interest because it is particularly difficult to synthesize in a conventional manner. In addition, it is found that the catalyst retains virtually all its activity after 3 utilizations.

EXAMPLES 16 and 17

These examples illustrate the use of polymeric supports containing nitrogenous groups other than pyridine, suitable for the catalysts of the invention.

These are:
poly-N-vinylimidazole (abbreviated to PVIm),
polyhistidine (abbreviated to PH).

The poly-N-vinylimidazole employed was prepared by radical polymerization of N-vinylimidazole in methanol using α,α'-azobisisobutyronitrile as initiator. The resulting polymer is soluble in methanol and water. It can be precipitated by adding acetone.

The poly-L-histidine is a commercial product (Sigma).

The active component employed is Mn-TMPS sulfonated metalloporphyrin whose attachment to these two supports was produced in the conditions described for polyvinylpyridine in Example 1. The poly-N-vinylimidazole-supported complex, Mn-TMPS/PVIm, is soluble in the acetonitrile-buffered water mixture employed for the catalytic oxidations described in the present application. On the other hand, the polyhistidine-supported catalyst, Mn-TMPS/PH, is insoluble in the same medium. Veratryl alcohol was chosen in order to compare the catalytic activity of these supported complexes with that of the same complex on polyvinylpyridine. The experimental conditions are those employed in Example 3 and the results are collated in Table 3 below.

TABLE 3

| Ex. | Catalyst | pH | % conversion after 15 min |
|---|---|---|---|
| 3 | Mn-TMPS/PVP | 6 | 93 (to be remembered) |
| 16 | Mn-TMPS/PVIm | 6 | 35 |
| 17 | Mn-TMPS/PH | 6 | 49 |

It should be noted that the polyhistidine-supported polymer, Mn-TMPS/PH, resists the oxidative conditions of the catalytic reaction well, like the polyvinylpyridine-supported complex, Mn-TMPS/PVP.

We claim:

1. Catalysts for the liquid phase oxidation of functional organic compounds, comprising metalloporphyrins carrying anionic groups as substituents which are active in the presence of an oxidizing agent, wherein the metalloporphyrins are immobilized on a support, insoluble in the liquid phase, of the polymeric type containing nitrogenous groups used as a Lewis base, by covalent bonding between the metal of the porphyrin and the nitrogen atom of the nitrogenous group and by electrostatic bonding between the anionic groups of the metalloporphyrins and the charged nitrogenous sites of the polymer.

2. Catalysts according to claim 1 wherein the nitrogenous groups are selected from the group consisting of pyridine, histidine and imidazole.

3. Catalysts according to claim 1 wherein the metalloporphyrins are substituted with mesotetraphenyl.

4. Catalysts according to claim 1 wherein the anionic groups are sulfonates.

5. Catalysts according to claim 4 wherein the meso-substituted phenyl nuclei carry anionic sulfonate groups.

6. Catalysts according to claim 1 wherein the metalloporphyrins are metal complexes of natural porphyrins containing at least one carboxylic acid anionic group placed in a pyrrolic position.

7. Catalysts according to claim 1 wherein the metalloporphyrins are metallized with iron or manganese.

8. Process for the preparation of a catalyst comprising metallic porphyrins carrying anionic groups as substituents which are active in the presence of an oxidizing agent, wherein the metalloporphyrins are immobilized on a support, insoluble in the liquid phase, of a polymeric type containing nitrogenous groups used as a Lewis base, by covalent attachment between the metal of the porphyrin and the nitrogen atom of the nitrogenous group, said process comprising in a first stage treating the polymer containing the groups used as a Lewis base in cationic form with a base permitting the deprotonation of the nitrogenous sites, in a second stage contacting the deprotonated polymer with a solution of metalloporphyrin for a sufficient time to establish the covalent bonds between the metal of the porphyrin and and the nitrogenous sites of the polymer and, in a third stage, treating the polymer-metalloporphyrin complex with a solution of an acid which, on reprotonating the nitrogenous sites of the polymer, permits the attachment, by electrostatic interaction, of the nitrogenous sites onto the anionic groups of the metalloporphyrin.

* * * * *